US012632588B2

(12) United States Patent
Mirji et al.

(10) Patent No.: US 12,632,588 B2
(45) Date of Patent: May 19, 2026

(54) INTEGRATED PRIVATE CLOUD AI PLATFORM

(71) Applicant: HEWLETT PACKARD ENTERPRISE DEVELOPMENT LP, Spring, TX (US)

(72) Inventors: Prakash Mirji, Spring, TX (US); Swami Viswanathan, Morgan Hill, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 61 days.

(21) Appl. No.: 18/823,115

(22) Filed: Sep. 3, 2024

(65) Prior Publication Data

US 2026/0064874 A1     Mar. 5, 2026

(51) Int. Cl.
| | |
|---|---|
| *G06F 21/62* | (2013.01) |
| *G06F 40/40* | (2020.01) |
| *H04L 9/40* | (2022.01) |
| *H04L 51/02* | (2022.01) |

(52) U.S. Cl.
CPC .......... *G06F 21/6227* (2013.01); *G06F 40/40* (2020.01); *H04L 51/02* (2013.01); *H04L 63/08* (2013.01)

(58) Field of Classification Search
CPC .. G06F 21/6227; G06F 21/62; G06F 21/6218; H04L 63/08
See application file for complete search history.

(56) References Cited

U.S. PATENT DOCUMENTS

| | | | | |
|---|---|---|---|---|
| 11,928,426 | B1 * | 3/2024 | Gutzeit | G06F 40/20 |
| 12,353,469 | B1 * | 7/2025 | Mahabadi | G06F 16/332 |
| 2021/0056169 | A1 * | 2/2021 | Bahirwani | H04L 51/02 |
| 2022/0318518 | A1 * | 10/2022 | Mars | G06N 5/04 |
| 2024/0146734 | A1 * | 5/2024 | Southgate | G06F 21/6227 |
| 2024/0355065 | A1 * | 10/2024 | Miller | G06T 19/006 |
| 2024/0394571 | A1 * | 11/2024 | Ivaturi | G06N 5/04 |
| 2024/0419830 | A1 * | 12/2024 | Park | G06F 21/6254 |
| 2025/0013436 | A1 * | 1/2025 | Mohanty | G16H 50/70 |
| 2025/0094816 | A1 * | 3/2025 | Hu | H04L 51/02 |
| 2025/0103741 | A1 * | 3/2025 | Kishan | G06N 5/022 |
| 2025/0133111 | A1 * | 4/2025 | Neystadt | H04L 63/1483 |
| 2025/0211549 | A1 * | 6/2025 | Arunachalam | H04L 51/02 |
| 2025/0370992 | A1 * | 12/2025 | Meteer | G06F 16/24522 |
| 2025/0371187 | A1 * | 12/2025 | Han | G06F 21/6227 |

OTHER PUBLICATIONS

Unknown author, Embedding (machine learning)—Wikipedia, printed: Jan. 8, 2026, 2 pages (Year: 2026).*
AWS, "Amazon Bedrock", available online at <https://aws.amazon.com/bedrock/>, 2024, 10 pages.

(Continued)

*Primary Examiner* — Ponnoreay Pich
(74) *Attorney, Agent, or Firm* — Dickinson Wright

(57) ABSTRACT

Systems and methods are provided for an integrated private cloud AI platform that is deployable at a customer site. The integrated private cloud AI platform can include components deployed at the customer site that utilize an embedding model that accesses/integrates with various knowledge bases and vector data stores locally at the customer site, and permit chatbot-accessible queries to an LLM that utilizes the previously-uploaded embeddings.

20 Claims, 6 Drawing Sheets

(56) References Cited

OTHER PUBLICATIONS

Cloud Architecture Center, "Infrastructure for a RAG-capable generative AI application using GKE", available online at <https://cloud.google.com/architecture/rag-capable-gen-ai-app-using-gke>, 2024, 16 pages.
Databricks, "A Compact Guide to Retrieval Augmented Generation (RAG)", 2024, 38 Pages.
HPE, "HPE Ezmeral Unified Analytics Software Documentation", available online at <https://docs.ezmeral.hpe.com/unified-analytics/14/index.html>, 2024, 1 page.
InfiniFlow, "Build Generative AI into Your Business", available online at <https://ragflow.io/>, 2024, 3 pages.
Snowflake, "Large Language Model (LLM) Functions (Snowflake Cortex)", available online at <https://docs.snowflake.com/en/user-guide/snowflake-cortex/llm-functions>, 2024, 22 pages.

* cited by examiner

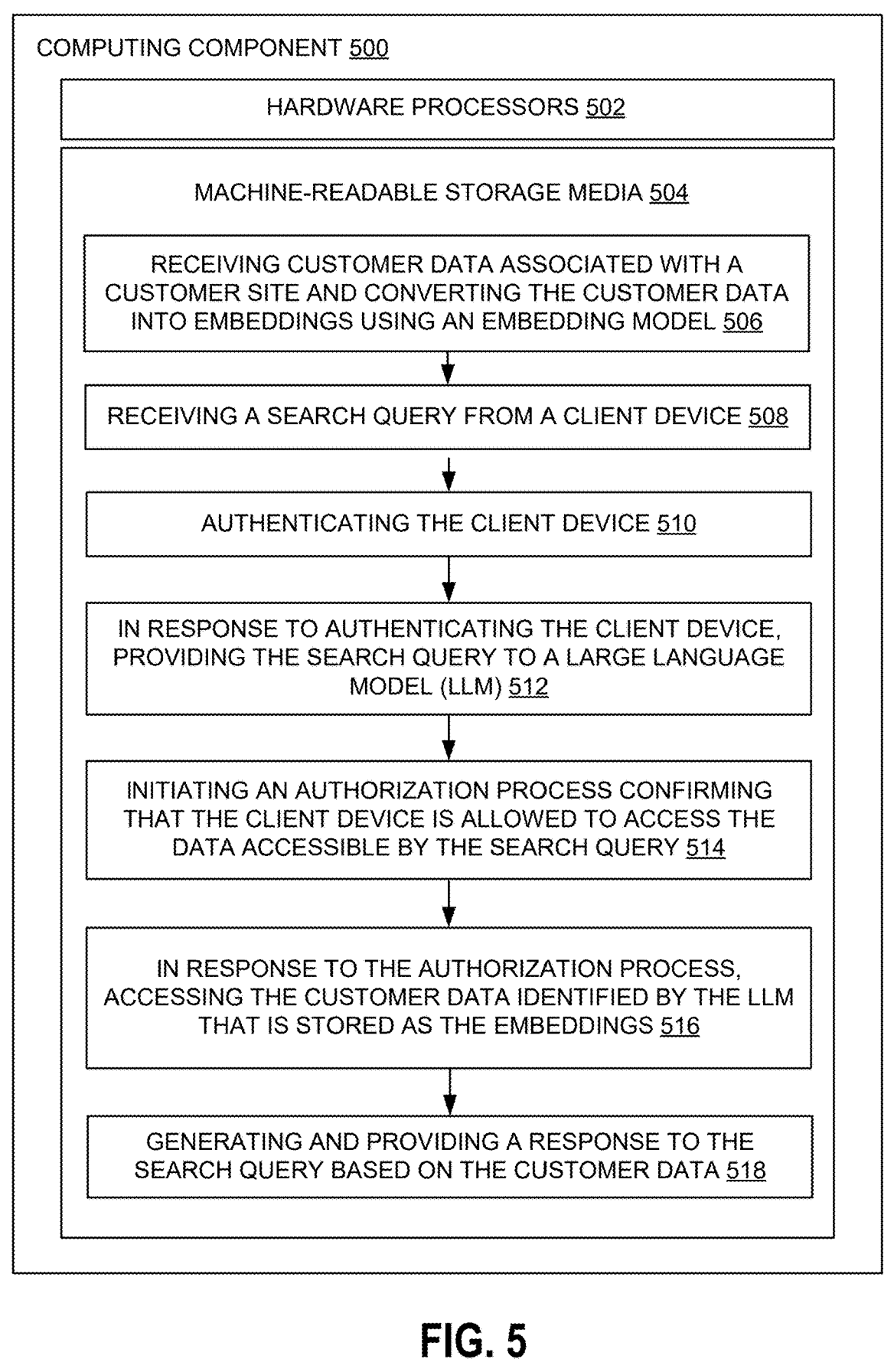

COMPUTING COMPONENT 500

HARDWARE PROCESSORS 502

MACHINE-READABLE STORAGE MEDIA 504

RECEIVING CUSTOMER DATA ASSOCIATED WITH A CUSTOMER SITE AND CONVERTING THE CUSTOMER DATA INTO EMBEDDINGS USING AN EMBEDDING MODEL 506

↓

RECEIVING A SEARCH QUERY FROM A CLIENT DEVICE 508

↓

AUTHENTICATING THE CLIENT DEVICE 510

↓

IN RESPONSE TO AUTHENTICATING THE CLIENT DEVICE, PROVIDING THE SEARCH QUERY TO A LARGE LANGUAGE MODEL (LLM) 512

↓

INITIATING AN AUTHORIZATION PROCESS CONFIRMING THAT THE CLIENT DEVICE IS ALLOWED TO ACCESS THE DATA ACCESSIBLE BY THE SEARCH QUERY 514

↓

IN RESPONSE TO THE AUTHORIZATION PROCESS, ACCESSING THE CUSTOMER DATA IDENTIFIED BY THE LLM THAT IS STORED AS THE EMBEDDINGS 516

↓

GENERATING AND PROVIDING A RESPONSE TO THE SEARCH QUERY BASED ON THE CUSTOMER DATA 518

FIG. 5

INTEGRATED PRIVATE CLOUD AI PLATFORM

CROSS-REFERENCE TO RELATED APPLICATIONS

This application is co-pending with U.S. patent application Ser. No. 18/947,627, filed Nov. 14, 2024 and U.S. patent application Ser. No. 18/822,824, filed on Sep. 3, 2024, the contents of which are incorporated by reference in their entirety for all purposes.

BACKGROUND

Machine learning models are processes the enable computers to learn from data and make decisions or predictions without being explicitly programmed for specific tasks. These models improve their performance as they are exposed to more data over time.

Types of machine learning models can include supervised learning models, like linear regression and classification models, unsupervised learning models, like clustering and dimensionality reduction, reinforcement learning models, and semi-supervised and self-supervised learning models. One type of machine learning model is a Large Language Models (LLMs) that involves both unsupervised and self-supervised learning. In LLMs, the models are specifically designed to understand, generate, and manipulate human language through advanced neural network architectures and programmatic executions to analyze large collections of data.

Since these LLMs are so complex, customer environments often run these models remotely from a model provider or other remote system. However, the use of remote systems can introduce security concerns with transferring data over an open network, restricting access to users who are permitted to access sensitive data, or issues with sharing a remote system with other entities, who are possibly direct competitors with the customer.

BRIEF DESCRIPTION OF THE DRAWINGS

The present disclosure, in accordance with one or more various examples, is described in detail with reference to the following figures. The figures are provided for purposes of illustration only and merely depict typical, non-limiting aspects of such examples.

FIG. 5 is an example computing component that may be used to implement various features of a set of models in accordance with examples discussed herein.

Figure 1:
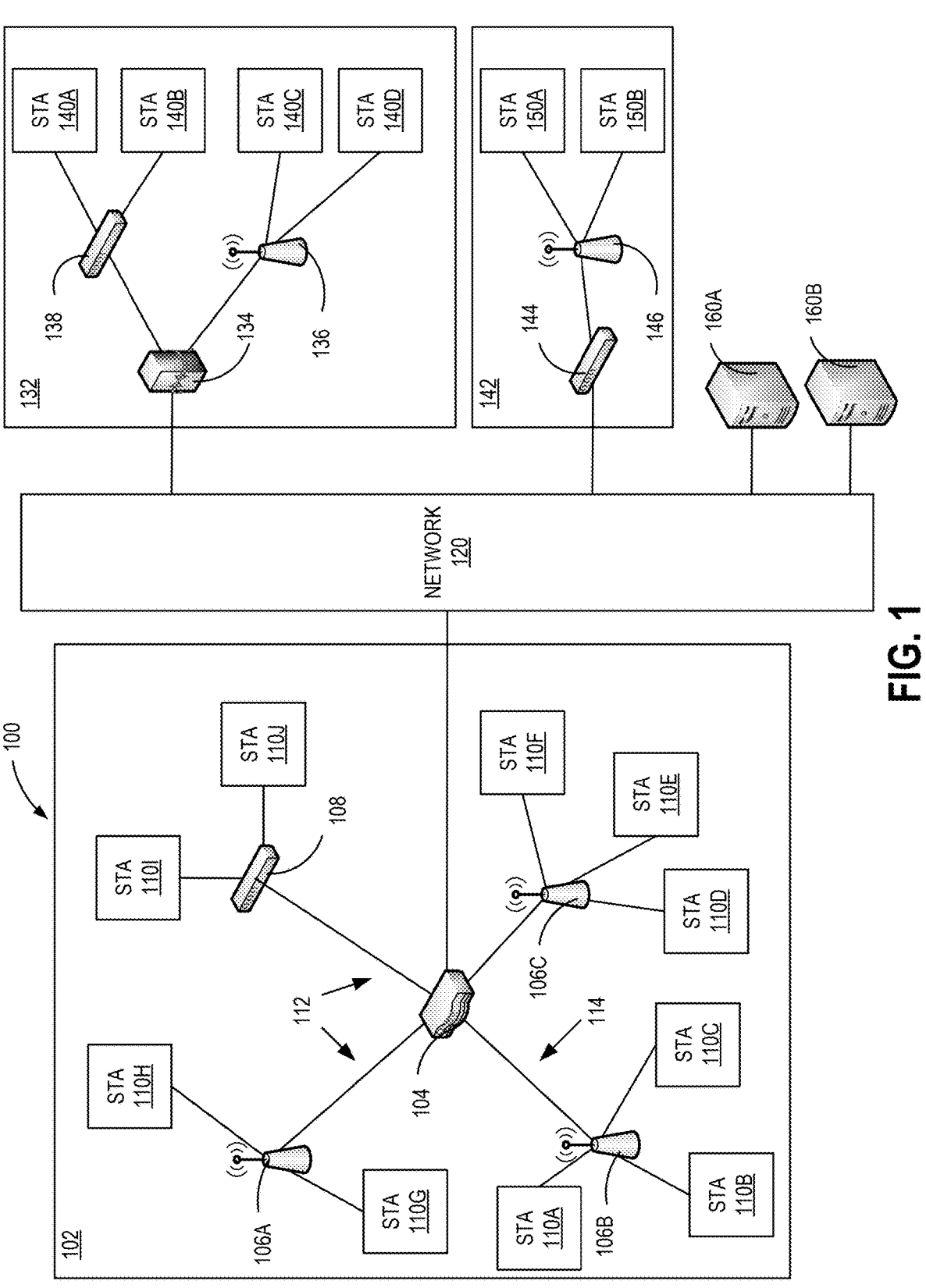
FIG. 1 illustrates one example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

Traditional LLMs are massive (e.g., 50-100 GB models), and downloading them to a customer site can take days due to technical limitations of the network. For example, the customer site may implement an intranet, private cloud, or other private network that is only accessible to authenticated and authorized members of the customer site, while other entities may utilize an Internet or other public network to attempt to communicate with devices at the customer site.

Computational layers may be added to the customer site to effectuate communications within and outside of the private network or private cloud environment. For example, one way to effectuate communications includes deploying a generative AI chatbot module to access data within the customer site and organizing/maintaining the data using an AI platform. The AI platform can organize existing data within the private cloud using embeddings and vector data structures, which help quickly and easily identify similarities between data and expedite searching procedures. The AI platform may also comprise LLMs in communication with the AI chatbot module that can expedite the data discovery within the private cloud environment. With several models in use within the AI platform, including an embedding model, vector model, LLM, and others, the AI platform can also implement procedures to help replace and deploy the models quickly into the customer's environment. The AI platform also provides better authentication/security to add another layer of protection for the computing environment and limit access to the customer's data.

More particularly, examples of the present disclosure describe an integrated private cloud AI platform that is deployable at a customer site to implement an improved retrieval-augmented generation (RAG) integrated AI platform with chatbot-accessible queries to an LLM. For example, the AI platform combines a generative LLM with embeddings and vector-based information retrieval to improve the data storage capabilities, information retrieval, security/authentication of the data, and optimize the validity of the response. The AI platform can include components deployed at the customer site that utilize an embedding model that accesses/integrates with various knowledge bases (e.g., locally at the customer site), and permits chatbot-accessible queries to the LLM that utilizes the previously-uploaded embeddings.

Various examples of the AI platform may be implemented. For example, an embedding model may be deployed at a customer site as part of the AI platform. The embedding model is configured to encapsulate data associated with the customer site into a multi-dimensional data structure. The data accessed by the embedding model may be identified by an administrative user in a pre-existing location outside the AI platform (e.g., first knowledge base) or directly uploaded to the AI platform by the administrative user (e.g., second knowledge base). In either instance, the AI platform may initiate an authentication/authorization process of the administrative user to confirm that the administrative user has the appropriate access level to provide the knowledge base and also is permitted to access the particular type of data. Upon authentication/authorization, the AI platform initiates a job to upload the knowledge base (as a converted embedding format) to the user's namespace (e.g., Kubernetes™ job). The AI platform can convert the embedding to a vector and store it in a vector data store.

The AI platform may receive a query from a user via a generative AI chatbot module and initiate a RAG that combines generative LLM with the previously stored embeddings, vectors, and other customer data. For example, the query can be associated with a customer question, help troubleshoot issues, or provide customized recommendations and solutions. The RAG can combine two different systems, a retrieval system that hunts for relevant information and an LLM that generates text. When the data is hosted from multiple data sources and multiple formats, traditional systems may have difficulty managing the multiple systems and data sources.

The AI platform may initiate an authentication/authorization process of the customer user that submitted the query. A policy engine may help confirm that the customer user has the appropriate access level to request the type of information that is included in the query. Upon authentication/authorization, the LLM passes the query to the embedding model to access the appropriate pre-processed information, including knowledge bases, vectors, and embeddings, and retrieve the data.

In some examples, the AI platform utilizes a RAG that relies on pre-created LLMs. These LLMs could be open-source models or enterprise-created models. The AI platform can provide an ability for customers/enterprises to deploy, manage, and scale these models. Since GPU resources may be limited or otherwise restricted, the AI platform may enable entities to share the models across multiple use cases and locations (e.g., finance, marketing, etc.).

In some examples, the AI platform re-uses a single LLM for different use case. In this example, for each solution accelerator, the knowledge base may be different and the LLM can be same while relying/accessing the different knowledge bases.

In some examples, the AI platform can provide an ability to auto-scale based on load, demand, or use. This can happen during the data preparation phase as well as during the customer interaction phase.

In some examples, the AI platform can implement data chunking (e.g., data partitioning or clustering). Depending on the use case, one or more chunking options, including data chunking based on a fixed value or a semantic process, may be supported. In some examples, the AI platform can provide the ability for administrative users to control access to AI platform accelerators.

Technical improvements are illustrated throughout the disclosure. For example, the components of the platform are interchangeable, so that the customer site can incorporate their own local knowledge base or other data without sharing the component with a public cloud/platform. Also, many of the components of the AI platform are interchangeable, which allows for switching out a first embedding model for a second embedding model without disassociating the rest of the process. Additionally, in this customer environment, the platform enables multi-layer authentication at several access points, which allow heightened security limitations on the data to help maintain data policy-based controls.

Before describing various examples of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. FIG. 1 illustrates an example of a configuration implemented with an organization having multiple users (or at least multiple client devices 110) and possibly multiple physical or geographical sites 102, 132, 142. Network configuration 100 may include primary site 102 in communication with network 120 that stores the AI platform. Network configuration 100 may also include one or more remote sites 132, 142, each of which may store portions/components of the AI platform. Each of these sites may be accessible by client devices that are permitted to submit queries to the LLM and previously-processed embeddings.

Primary site 102 may include a primary network, which may be an office network, home network, or other network installation, for example. The primary network may be a private network, such as a network that may include security and access controls to restrict access to authorized users of the private network. Authorized users may include employees of a company at primary site 102, residents of a house, customers at a business, for example.

In the example of FIG. 1, primary site 102 includes controller 104, which is in communication with network 120. Controller 104 may provide communication with network 120 for primary site 102. There may be other points of communication with network 120 for primary site 102 in addition to controller 104. Although single device associated with controller 104 is illustrated, primary site 102 may include multiple controllers and/or multiple communication points with network 120. In some examples, controller 104 may communicate with network 120 through a router. In other examples, controller 104 provides router functionality to the devices in primary site 102. In this specification, the word "tunnel" refers to an encapsulated mode of transporting data between AP and controller.

Controller 104 may be operable to configure and manage network devices, such as at primary site 102, and may also manage network devices at remote sites 132, 142. Controller 104 may be operable to configure and/or manage switches, routers, access points, and/or client devices connected to a network. Controller 104 may itself be, or provide the functionality of, an Access Point (AP).

Controller 104 may be in communication with one or more switches 108 and/or wireless Access Points (APs) 106a-c. Switches 108 and wireless APs 106a-c provide network connectivity to various client devices 110a-j. Using a connection to switch 108 or AP 106a-c, client device 110a-j may access network resources, including other devices on the (primary site 102) network and network 120.

Examples of client devices may include: desktop computers, laptop computers, servers, web servers, authentication servers, authentication-authorization-accounting (AAA) servers, domain name system (DNS) servers, dynamic host configuration protocol (DHCP) servers, internet protocol (IP) servers, virtual private network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, internet of things (IOT) devices, and the like.

Within primary site 102, switch 108 is included as one example of a point of access to the network established in primary site 102 for wired client devices 110i-j. Client devices 110i-j may connect to switch 108 and through switch 108, may be able to access other devices within network configuration 100. Client devices 110i-j may also be able to access network 120, through switch 108. Client devices 110i-j may communicate with switch 108 over a wired or wireless connection 112. In the illustrated example, switch 108 communicates with controller 104 over a wired or wireless connection 112.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the example of FIG. 1, APs 106a-c can be managed and configured by controller 104. APs 106a-c communicate with controller 104 and the network over connections 112, which may be either wired or wireless interfaces.

Network configuration 100 may include one or more remote sites 132. Remote site 132 may be located in a different physical or geographical location from primary site 102. In some cases, remote site 132 may be in the same geographical location, or possibly the same building, as primary site 102, but lacks a direct connection to the network located within primary site 102. Instead, remote site 132 may utilize a connection over a different network, e.g., network 120. Remote site 132 such as the one illustrated in FIG. 1 may be a satellite office, another floor or suite in a building, for example. Remote site 132 may include gateway device 134 for communicating with network 120. Gateway device 134 may be a router, a digital-to-analog modem, a cable modem, a digital subscriber line (DSL) modem, or some other network device configured to communicate with network 120. Remote site 132 may also include switch 138 and/or AP 136 in communication with gateway device 134 over either wired or wireless connections. Switch 138 and AP 136 provide connectivity to the network for various client devices 140a-d.

In various examples, remote site 132 may be in direct communication with primary site 102, such that client devices 140a-d at remote site 132 access the network resources at primary site 102 as if these client devices 140a-d were located at primary site 102. In such examples, remote site 132 is managed by controller 104 at primary site 102, and controller 104 provides the necessary connectivity, security, and accessibility that enable the connection between remote site 132 and primary site 102. Once connected to primary site 102, remote site 132 may function as a part of a private network provided by primary site 102.

In various examples, network configuration 100 may include one or more smaller remote sites 142, comprising gateway device 144 for communicating with network 120 and wireless AP 146, by which various client devices 150a-b access network 120. Examples of remote site 142 may represent, for example, an individual employee's home or a temporary remote office. Remote site 142 may also be in communication with primary site 102, such that client devices 150a-b at remote site 142 access network resources at primary site 102 as if these client devices 150a-b were located at primary site 102. Remote site 142 may be managed by controller 104 at primary site 102 to make this transparency possible. Once connected to primary site 102, remote site 142 may function as a part of a private network provided by primary site 102.

Network 120 may be a public or private network, such as the Internet, or other communication network to allow connectivity among various sites 102, 132, 142 as well as access to servers 160a-b. Network 120 may include third-party telecommunication lines, such as phone lines, broadcast coaxial cable, fiber optic cables, satellite communications, cellular communications, and the like. Network 120 may include any number of intermediate network devices, such as switches, routers, gateways, servers, and/or controllers, which are not directly part of network configuration 100 but that facilitate communication between the various parts of the network configuration 100, and between the network configuration 100 and other network-connected entities. Network 120 may include various servers 160a-b. In an example, servers 160a-b may comprise content servers that include various providers of multimedia downloadable and/or streaming content, including audio, video, graphical, and/or text content, or any combination thereof. Examples of content servers 160a-b include web servers, streaming radio and video providers, and cable and satellite television providers. Client devices 110a-j, 140a-d, 150a-b may request and access the multimedia content provided by content servers 160a-b.

In another example, servers 160a-b may comprise flow optimization service server that include various information for provisioning services to client devices 110a-j, 140a-d, 150a-b and optimizing traffic flows in accordance with the examples disclosed herein. Access points 106a-c, 136, and 146; switches 108; and gateway devices 134 and 144 may request or upload information, such as telemetry data, for optimizing rendering of services to client devices 110a-j, 140a-d, 150a-b. The information may include, but is not limited to, a measure or estimate of QoE on a per traffic flow basis (e.g., referred to herein as a QoE score); flow characteristics and other QoS measurements, such as but not limited to, jitter, delay, airtime, latency, etc.; analytics; transmission protocols (e.g., OFDMA and MU-MIMO), and the like. The information may be stored in a database, which can be communicatively coupled to servers 160a, 160b. In examples, servers 160a-b may be cloud-based, which would be understood by those of ordinary skill in the art to refer to being, e.g., remotely hosted on a system/servers in a network (rather than being hosted on local servers/computers) and remotely accessible.

In examples where servers 160a-b are cloud-based, servers 160a-b may store components of a public cloud and the private cloud (illustrated at 102), respectively. In some examples, servers 160a-b may store components that are downloaded local to primary site 102 or remote site 132 to help implement the private cloud. The private cloud may implement an integrated AI platform at the customer site to organize and maintain knowledge bases of customer data. The private cloud may be accessible using a generative AI chatbot, as described throughout the disclosure. In some examples, the server that implements the public cloud may store machine learning models (e.g., embedding model, pre-trained LLM, etc.) that can be downloaded to the private cloud and integrated into the private cloud.

Figure 2:
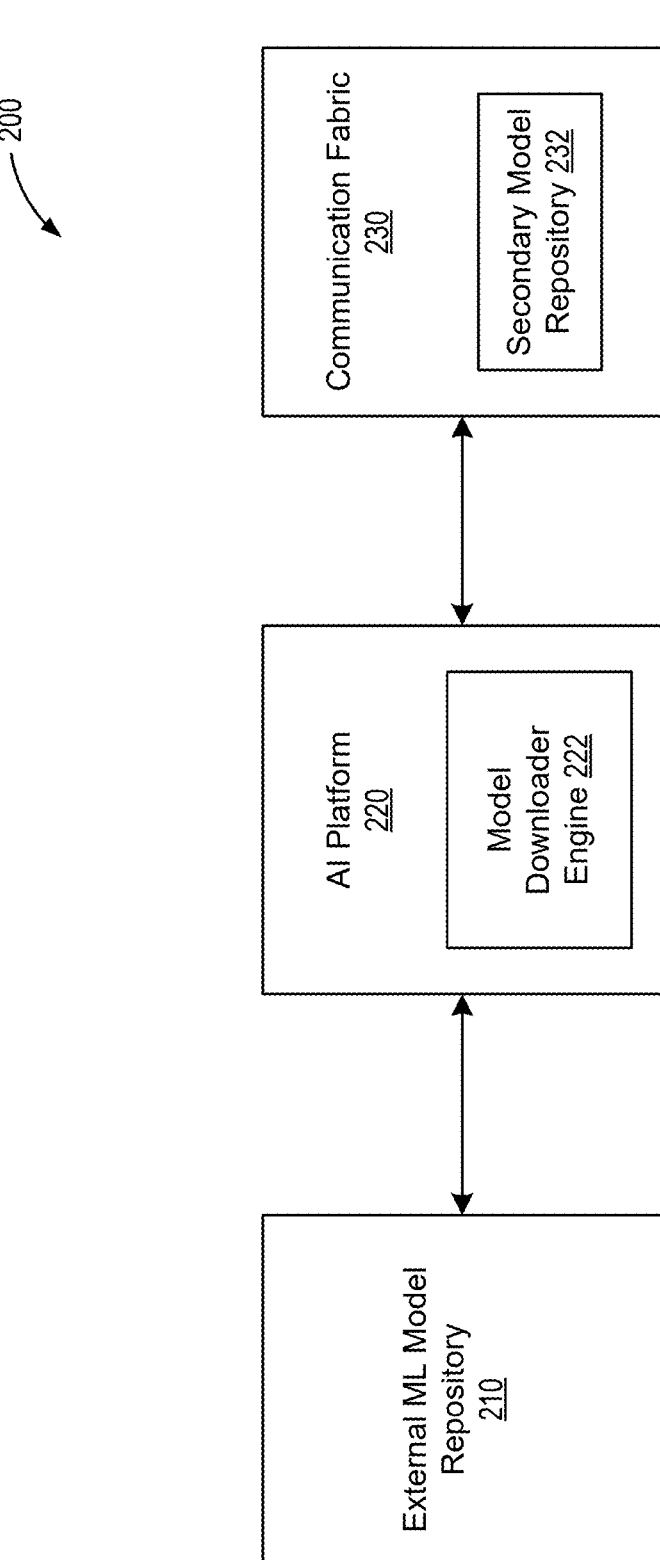
FIG. 2 is an illustrative AI platform, external model repository, and communication fabric, in some examples of the disclosure.

FIG. 2 is an illustrative AI platform, external model repository, and communication fabric, in some examples of the disclosure. In example 200, external machine learning (ML) model repository 210, AI platform 220, and communication fabric 230 are illustrated, where each device/component communicates via a network. In some examples, AI platform 220 comprises model downloader engine 222 and communication fabric 230 comprises secondary model repository 232.

External ML model repository 210 comprises pre-trained machine learning models that can be provided to AI platform 220 located at the customer site. External ML model repository 210 may pre-stage the ML models and ship them to the customer. In other examples, external ML model repository 210 may comprise open source models or models that are otherwise accessible via external systems that can be downloaded to AI platform 220 (via model downloader engine 222 via a network).

AI platform 220 is implemented on a private cloud at a customer site and comprises an embedding model that accesses the data locally stored at the customer site or external data sources that are uploaded to AI platform 220. For example, AI platform 220 can receive a request to add other knowledge bases or models, which can be implemented using model downloader engine 222. Each request to access the data, upload a new model, and so on, may be preceded by an authentication/authorization process of the requesting user to help confirm that the user has the appropriate access level to perform the action.

AI platform 220 can also allow access to the data/models stored with the customer site private cloud. The data/models may be accessible via a generative AI chatbot module that accepts the query and passes it to an LLM. The LLM can access the previously-stored data via an embedding model, vector data store, or other data structures described throughout the application, and retrieve the appropriate data to generate a query response.

Communication fabric 230 may comprise a coordinator for transmitting communications throughout many electronic environments. In some examples, the coordinator is implemented as a Kubernetes™ engine that provides a hosted coordinator model. Communication fabric 230 may receive/pull models from various sources and store the models in secondary model repository 232 associated with communication fabric 230.

Figure 3:
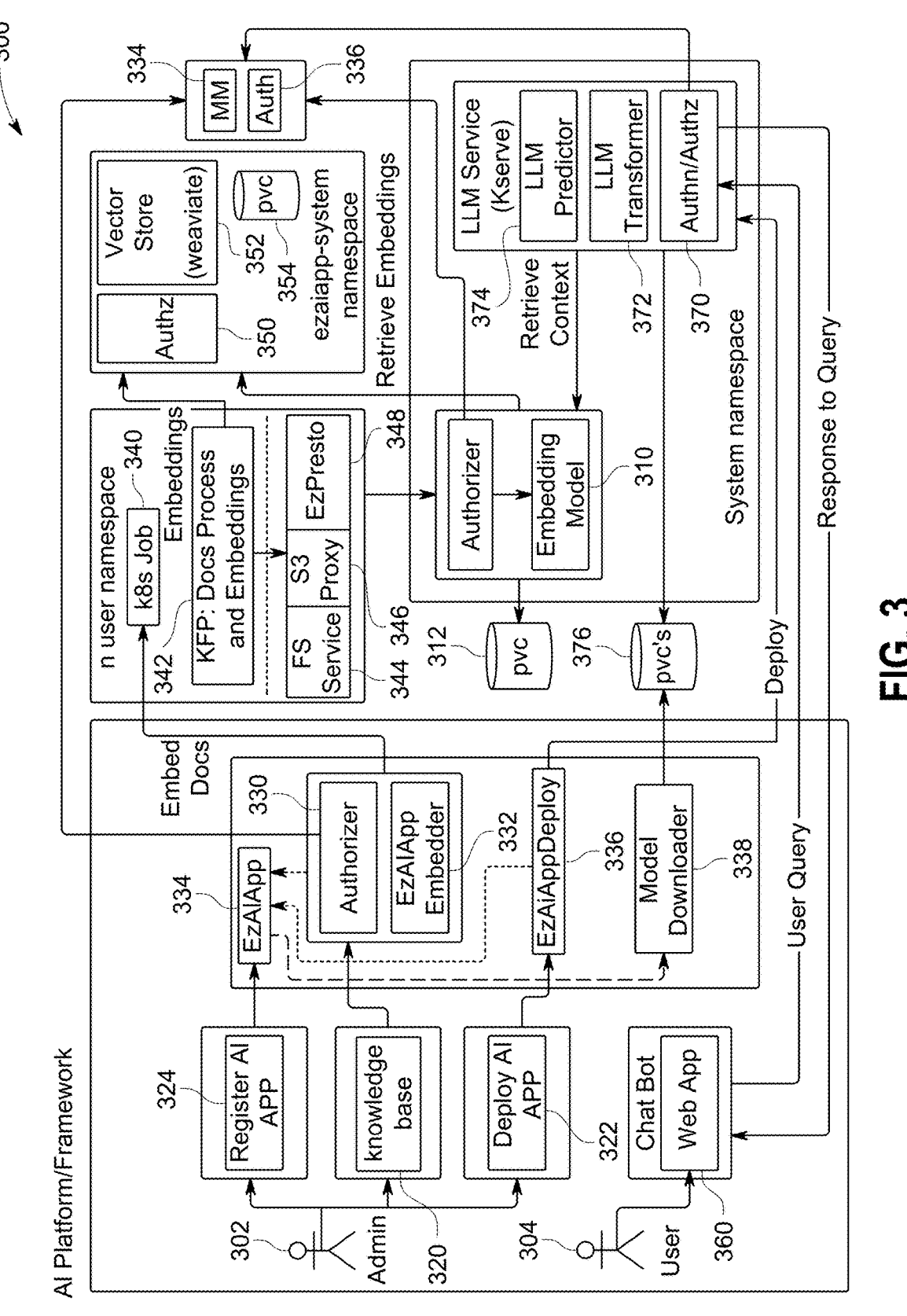
FIG. 3 is an illustrative AI platform, in some examples of the disclosure.

FIG. 3 is an illustrative AI platform, in some examples of the disclosure. In example 300, AI platform is provided in detail, which may be similar to AI platform 220 illustrated in FIG. 2. Multiple users may interact with the AI platform, including administrative user 302 and general user 304, each corresponding with different access levels and profiles.

At block 310, the AI platform receives embedding model. The embedding model may correspond with an algorithm that is trained to encapsulate information (e.g., a knowledge base) into a multi-dimensional space. In some examples, the embedding model is received from an external ML repository (e.g., external ML model repository 210 in FIG. 2 or via communication fabric 230 in FIG. 2). In other examples, multiple models are received from an external ML repository (e.g., block 338).

In some examples, the embedding model may be deployed at a customer site as part of the AI platform. The embedding model may access data and create portions of the data in association with a chunk size. The embedding can convert the text representations of the data into a numerical format or binary as a secondary format of the data. The embedding model may access the knowledge base at the customer site, which is converted to the secondary format.

In some examples, the knowledge base may be uploaded by a user. For example, the knowledge base comprises data that may be identified by administrative user 302 in a pre-existing location outside the platform (e.g., first knowledge base) or uploaded by administrative user 302.

At block 312, the AI platform stores the embedding model in an embedding model data store. For example, the embedding model may be stored as the model's parameters in the model data store.

At block 320, the AI platform receives a second knowledge base. For example, administrative user 302 requests to add the second knowledge base to the platform. When a second knowledge base is received, the AI platform can convert the knowledge base to into a multi-dimensional space associated with the embedding model.

At block 322, the AI platform may deploy an AI app (e.g., solution accelerator of AI platform). In some examples, the deployment of the AI app may comprise deploying an identified machine learning model at a processor (e.g., GPU). The deployment may use any metadata that has been identified during a registration process to help deploy the model. In response to deploying the model, other component of AI platform may interact with the model. In the example where the model is an LLM, the AI platform may deploy the LLM and the chatbot component may begin interacting with the LLM to generate responses to queries.

In some examples, administrative user 302 may review the available models that have been registered with the AI platform and select the models that it wants to implement. The review and selection of the models may be implemented through a user interface of AI platform.

At block 324, the AI platform may register the AI app (e.g., using the solution accelerator of the AI platform). In some examples, the registration of the AI app may comprise identifying a machine learning model from a remote or cloud location. The process may also identify metadata associated with the model (e.g., name of the model, logo, description of the training process, and other descriptions of the model).

In some examples, administrative user 302 may review the available models that have been downloaded with the AI platform and select the models for registration. The models that are selected for registration may be deployed to AI platform (block 322). The review and selection of the models may be implemented through a user interface of AI platform.

At block 330, the AI platform may initiate an authentication process for administrative user 302. For example, administrative user 302 may provide login credentials (e.g., username and password). The user may be previously logged in or prompted to provide login credentials. In some examples, the user may be associated with an authentication token that is passed from the client device to the AI platform and included with communications between the user and the platform.

A policy engine may define the appropriate access level for administrative user 302. For example, before the embedding model (block 310) or LLM (blocks 372, 374) has to access to particular data collections, the platform may access the policy engine to confirm that user is allowed to use that data that the corresponding model will be accessing. In other examples, access to vector data store (block 354) may be programmatically limited and restricted.

The AI platform may also initiate an authorization process for administrative user 302. The authorization for administrative user 302 may identify a level of access where the administrative user 302 should be able to access. The authorization process can also confirm that administrative user 302 is able to upload a new knowledge base, is permitted to access the particular type of data, or provide information to the system with a valid authorization/policy to perform the action.

Multiple authorization processes may be implemented throughout the system, including uploading a new knowledge base, submitting queries via the AI chatbot module, or other features that allow access to data or inputting new data.

In an illustrative example, a user from a marketing division of the customer site may be permitted to access different data than a user associated with the human resources (HR) division. The corresponding division policy or permission may be provided to the authorization process of the AI platform. When the user submits a query (block 360), the authorization level may be provided via the AI chatbot module. The response may be generated and filtered to only include information from the authorization level of the user.

At block 332, the AI platform executes an EzAIApp embedder. In some examples, the embedder may identify a new knowledge bases or other data (e.g., S3 or cloud storage) and copy the data to a local and temporary data store. In response to the data being stored in the temporary data store, the embedder may initiate the embedding process on the new data and may also initiate the conversion of the embedding to the vector format, to create new embeddings/vectors and store the new embeddings/vectors.

In some examples, administrative user 302 may interact with the interface to identify the knowledge base and models (e.g., locations, metadata, and other information) to implement with the AI platform.

In some examples, the AI platform may identify the models that have been registered and deployed as the new data. These models may be available for use. AI platform may initiate an embedding process of the registered/deployed models.

At block 334, the microservices manager provides a way to manage microservices in a cloud-native application. It offers a range of features for managing the communications (e.g., traffic management, load balancing, etc.), security (e.g., authentication, authorization, encryption, etc.), and observability (e.g., metrics, tracing, logging, etc.) of microservices.

At block 336, the authorization engine may confirm that the user requesting the update to the embedding model has access credentials and policy rights to make the changes to the system.

At block 340, the AI platform provides the embedding document to a user's namespace. For example, the user's namespace may comprise a portion of the AI platform where tasks, services, and workloads are deployed in association with a user. The namespace may be a logical partition within a Kubernetes™ cluster that helps organize and manage resources for executing these processes for the user. In some examples, the namespace data structure for each user may help divide cluster resources between the multiple users or applications to help avoid scheduling and processing conflicts. Each namespace can have its own set of resources like pods, services, and deployments.

Upon passing or completing the authentication and authorization process, the AI platform initiates a Kubernetes™ job to upload the knowledge base to the user's namespace, making it accessible to the user associated with the particular namespace. The uploading may trigger additional workflows, as shown with blocks 342, 344, 346, and 348, as part of the process to create the vector data store at block 352.

In some examples, the AI platform may also create an embedding of the second knowledge base. The generation of the embedding of the second knowledge base may allow the data associated with the knowledge base to be stored in a format that is searchable/accessible by the rest of the platform.

At block 342, the AI platform processes the embedding document using the Kubeflow™ pipeline or other cloud-based job/workload that may be orchestrated by the Kubeflow™ component. The role of job may be to execute the software-bsed instructions that initiate the actual interactions with the embedding model to create embeddings. In some examples, the Kubeflow™ component may also interact with the vector store to store the vectors.

At block 344, the AI platform may initiate an FS service to help integrate and manage data storage systems with Kubernetes™ and the corresponding namespace. The FS service may run on each user namespace and mount the user specific volumes. The FS service may provide an application programming interface (API) to read and write to user specific volumes.

In association with the FS service, the AI platform or the Kubernetes™ component may initiate a persistent volume (PV) that represents a portion of a data store that has been provisioned by an administrator or dynamically provisioned using Storage Classes. In another example, the platform may initiate a Persistent Volume Claim (PVC) that is initiated via a request for a PV with specific storage requirements, such as size and access modes. Kubernetes™ then binds PVCs to suitable PVs.

In another example, the platform may define and dynamically provision different types of storage classes in a Kubernetes™ cluster. Storage Classes help manage different types of storage systems (e.g., SSDs, HDDs) and their configurations. In another example, the platform may implement various volume types, including EmptyDir (e.g., temporary storage that is created when a Pod is assigned to a node and exists as long as the Pod is running on that node), HostPath (e.g., enables a Pod to use a file or directory on the host node's filesystem), Network File System (NFS) (e.g., enables a Pod to access an NFS share and shared access to files across multiple Pods), or ConfigMap and Secret (e.g., stores configuration data and sensitive information respectively, which can be accessed by Pods as files or environment variables).

At block 346, the AI platform may implement an S3 Proxy to interact with external services (e.g., Amazon S3 (Simple Storage Service), etc.). The S3 proxy may integrate an external service to create a persistent storage in the namespace. In some examples, the S3 proxy may generate a generic S3 proxy interface to connect to an external S3 object store to read the knowledge base or other data from remote object store. The S3 proxy may be implemented to remove the credential/authentication process from the user interaction with the AI platform (e.g., using their access token). In some examples, the S3 proxy be previously authorized and may interact with external S3 object store instead the user pipeline.

At block 348, the AI platform may implement a distributed query engine (e.g., Presto) that is configured to run interactive analytic queries against various data sources, including embedding model (block 310). In some examples, the distributed query engine may also provide charts to help install and manage the query data structure, operators to connect to the external structured data sources (e.g., MySQL database or Postgresql™ database) to read the structured data. The data may correspond with the customer's knowledge base that is stored with the structured data sources. The AI platform can use this interface to read the knowledge base.

At block 350, the AI platform may initiate an authorization process for administrative user 302 that uploads the vector model (block 352) to the vector data store (block 354). For example, the authorization for administrative user 302 may identify a level of access where the administrative user 302 should be able to access (e.g., namespace, etc.) and confirm that administrative user 302 is able to access the vector model.

At block 352, the AI platform converts the embedding document into a vector representation. For example, the AI platform stores the second knowledge base in a vector data store (block 354). Many knowledge bases may be stored in an embedded format in the vector data store.

At block 360, the AI platform provides an AI chatbot module or virtual assistant (used interchangeably) that is accessible by user 304. The chatbot module can provide an interface to interact with the LLM or other pre-trained and pre-downloaded models that are accessible on the AI platform. In some examples, the chatbot module may be accessible in a public cloud environment.

The AI platform may receive a query from a user via a generative AI chatbot module. The query can be associated with a customer question, help troubleshoot issues, or provide customized recommendations/solutions. In some examples, user 304 provides query to the AI chatbot module. The AI chatbot module can transmit the query to an authentication associated with an LLM.

At block 370, the AI platform may initiate an authentication and authorization process for user 304. For example, when the user is authentication with login credentials (e.g., username and password), the AI platform may initiate a first authentication process by comparing the login credentials with permitted users that can access the LLM component. In examples where a token is implemented, the token can be transmitted with the query and received by the LLM. The LLM can determine whether the login credentials or token is associated with a valid user. As a second authentication process, the AI platform can determine whether the query from the user allowed to ask question about that particular solution A policy engine may help confirm that the customer user has the appropriate access level to request the type of information that is included in the query. For example, the policy engine may implement policy-based access control (PBAC) to evaluate a user's location, role in the customer environment, rank, and other attributes to determine if they should be granted access. The policy engine may implement Boolean logic to evaluate whether the access request is legitimate.

At block 372, the AI platform may provide the query to the LLM transformer. At this step, the LLM transformer may weigh the importance of different words in the query when determining the response for the query.

At block 374, the AI platform may access the model data store (block 376) using the LLM predictor. In some examples, the LLM passes the query to the embedding model to access the appropriate embedding. The AI platform may access the vector data store (block 354) to retrieve the matching embedding that is previously stored in the system. The matching embedding is returned and used to generate a response to the query.

Figure 4:
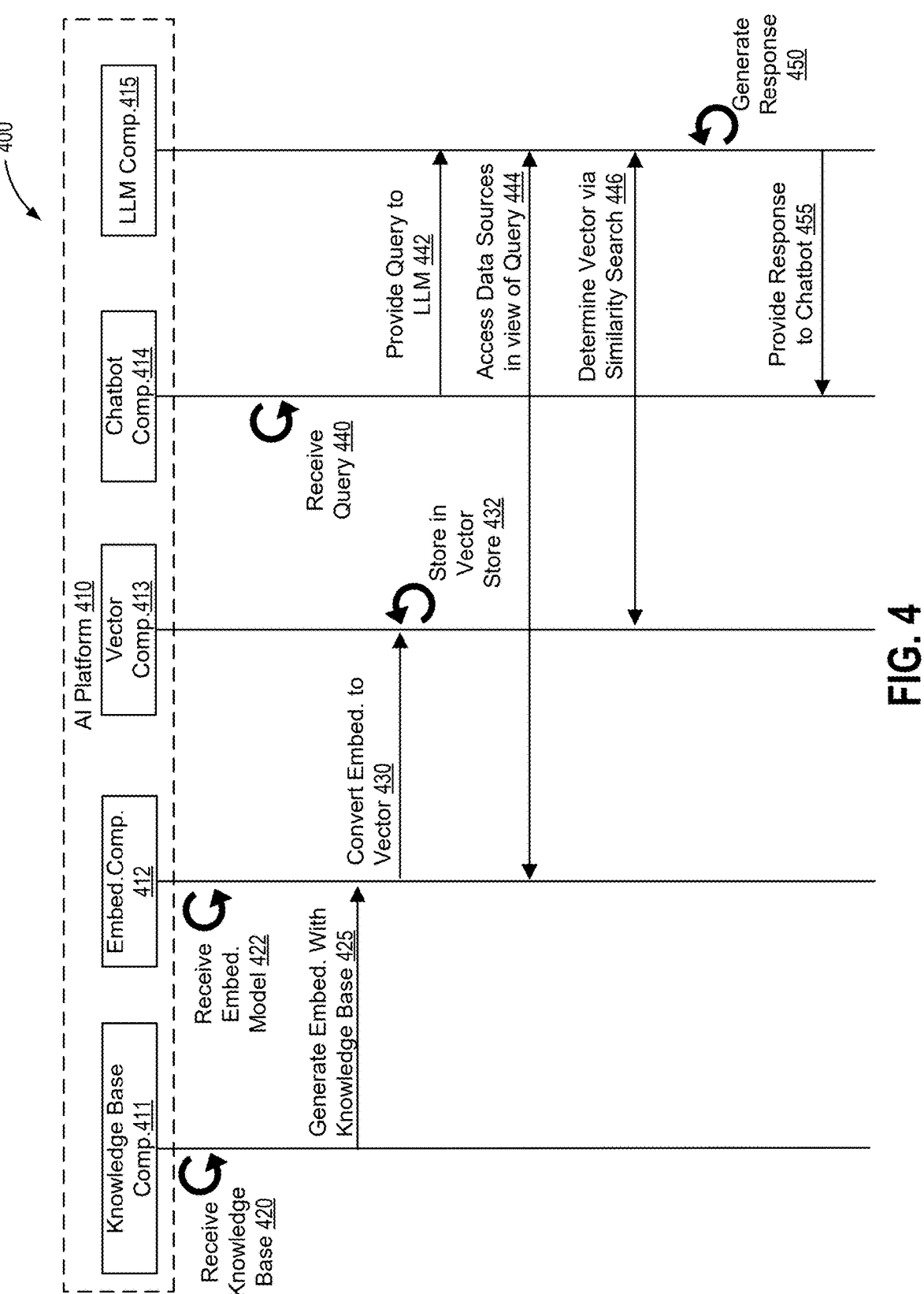
FIG. 4 is an illustrative communication process within the AI platform, in some examples of the disclosure.

FIG. 4 is an illustrative communication process within the AI platform, in some examples of the disclosure. In example 400, various components of AI platform 410 are provided, which may correspond with services, devices, or other components in the private cloud. In this illustration, the components comprise knowledge base component 411, embedding component 412, vector component 413, chatbot component 414, and LLM component 415.

Knowledge base component 411 comprises data that may be identified by an administrative user in a pre-existing location outside the platform or uploaded by the administrative user.

Embedding component 412 comprises an embedding model that may convert a knowledge base or other data to into a multi-dimensional space. In some examples, the embedding model is an externally available model outside the private cloud of the customer environment (e.g., Word2Vec or GloVe). In some examples, the knowledge base or other data may be cleaned prior to providing the data to embedding component 412 to fit the requirements of the embedding model. For text, the data may be tokenized, converted to lower case, and punctuation may be removed. For images, the data may be resized, normalized, or otherwise transformed.

Vector component 413 comprises a representation of the embedding in a fixed-dimensional space. For example, the output from embedding component 412 may be a vector representing the input data/knowledge base. The vector may correspond with the last hidden state for text embeddings or a fully connected layer for image embeddings.

Chatbot component 414 comprises an interface tool that receives a query from a user and provides an output to the user. The interface tool may allow interactions between the client device at the AI platform (e.g., LLM), including an input text field, send button, context management (e.g., handles the continuity of conversation by keeping track of the interaction history), and error handling (e.g., component to manage and display errors).

LLM component 415 comprises a large language model (LLM) that has been trained to understand and generate a response to a query. The LLM may analyze the unstructured data of the query and structured embedding/vectors available in the AI platform when generating the response.

At block 420, knowledge base component 411 of AI platform 410 may receive a knowledge base. The knowledge base can be uploaded by an authorized administrative user or accessible from a knowledge base data store in the customer environment.

At block 422, embedding component 412 of AI platform 410 may receive an embedding model. In some examples, the embedding model is received from an external data source.

At block 425, embedding component 412 of AI platform 410 may receive the knowledge base and any other pre-existing customer data and generate embeddings of them. The data store may be accessible in the customer environment. Embedding component 412 may generate an embedding of the data accessible in the customer environment.

At block 430, vector component 413 of AI platform 410 may convert the embeddings of pre-existing customer data and the knowledge base to vector representations. For example, in response to identifying the knowledge base, the knowledge base may be uploaded to the user's namespace and converted to a vector.

AT block 432, vector component 413 may store the vector representations of the embddings in a vector store.

At block 440, chatbot component 414 of AI platform 410 receives a query from a user. The query may be received via a user interface component that displays the chatbot. In some examples, the chatbot may prompt the user to submit the query.

At block 442, chatbot component 414 of AI platform 410 provides/submits the query to LLM component 415. In some examples, the LLM may be a single LLM that is reused for multiple purposes and data types, although other implementations are possible without diverting from the essence of the disclosure.

At block 444, LLM component 415 of AI platform 410 accesses data stores via embedding component 412 (e.g., embedding model). The data stores may be relevant to the response to the query from the user. In some examples, even though the LLM may be reused, the embeddings of the various data sources may be data type specific.

At block 446, LLM component 415 accesses the vector data store via vector component 413 of AI platform 410. LLM component 415 may initiate a similarity comparison between the embeddings/vector representations and the characteristics of the query. The relevant vector representations of the data may be retrieved based on their similarity association with the query.

As an illustrative example, embedding component 412 generates an embedding of the data requested for the query and submits the embedding (as a vector representation) to the vector store to access a matching embedding that has been previously stored. The LLM may match results that are identified between the query and the stored vectors. The matched results may be returned, as a retrieval augmented generation (RAG) process using the embedding, vector, and previously stored data.

At block 450, LLM component 415 of AI platform 410 may generate a response to the query. For example, in response to the LLM processing the query, analyzing the context and meaning to understand what is being asked, and accessing the appropriate data (e.g., embedding/vector), the LLM generates a response. In some examples, the LLM can predict and assemble words and phrases that form a coherent and relevant reply. The generated response may be formatted to a clear and readable format.

At block 455, LLM component 415 of AI platform 410 may provide the generated response to the chatbot component 414 of AI platform 410 (e.g., viewable via display of the client device).

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 5 illustrates a computing component that may be used to implement a lineage-based classification of network events, in accordance with various examples of the disclosed technology. Referring now to FIG. 5, computing component 500 may be, for example, a server computer, a controller, or any other similar computing component capable of processing data. In the example implementation of FIG. 5, the computing component 500 includes hardware processor 502 and machine-readable storage medium 504.

Hardware processor 502 may be one or more central processing units (CPUs), semiconductor-based microprocessors, and/or other hardware devices suitable for retrieval and execution of instructions stored in machine-readable storage medium 504. Hardware processor 502 may fetch, decode, and execute instructions, such as instructions 506-512, to control processes or operations for a lineage-based classification of network events. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 504 may be a non-transitory storage medium, where the term "non-transitory" does not encompass transitory propagating signals. As described in detail below, machine-readable storage medium 504 may be encoded with executable instructions, for example, instructions 506-512.

Hardware processor 502 may execute instruction 506 to receive customer data associated with a customer site and converting the customer data into embeddings using an embedding model.

Hardware processor 502 may execute instruction 508 to receive a search query from a client device.

Hardware processor 502 may execute instruction 510 to authenticate the client device.

Hardware processor 502 may execute instruction 512 to provide the search query to a large language model (LLM). In some examples, the search query may be provided to the LLM in response to authenticating the client device.

Hardware processor 502 may execute instruction 514 to initiate an authorization process confirming that the client device is allowed to access the data accessible by the search query.

Hardware processor 502 may execute instruction 516 to access the customer data identified by the LLM that is stored as the embeddings. In some examples, the access to the customer data may be in response to the authorization process.

Hardware processor 502 may execute instruction 518 to generate and provide a response to the search query based on the customer data.

Figure 6:
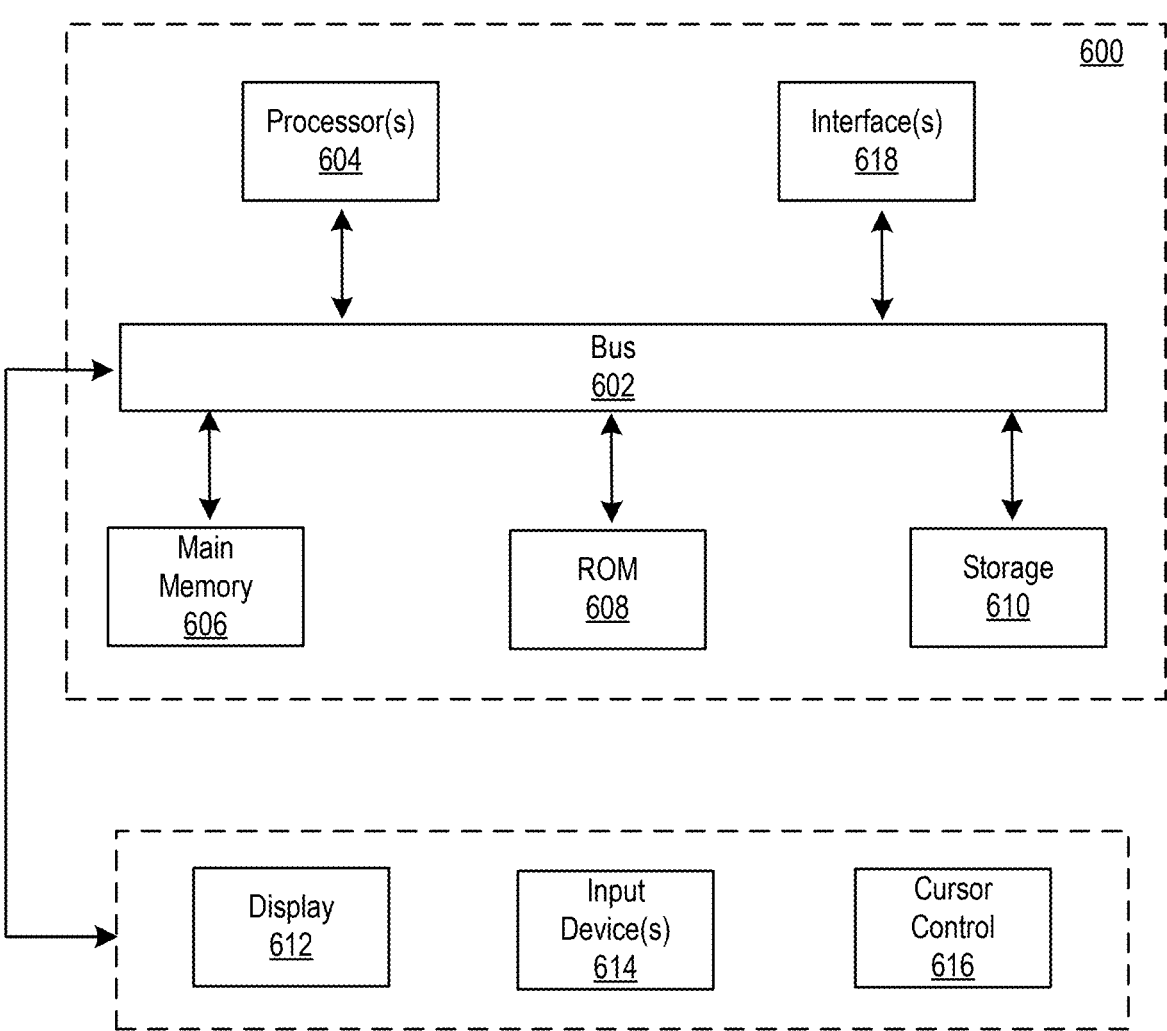
FIG. 6 is a computing component that may be used to implement examples of the disclosed technology.

FIG. 6 depicts a block diagram of an example computer system 600 in which various examples of the disclosed technology described herein may be implemented, including the AI platform with embedding model, vector data store, chatbot module, LLM, and other components described herein. Computer system 600 includes bus 602 or other communication mechanism for communicating information, one or more hardware processors 604 coupled with bus 602 for processing information. Hardware processor(s) 604 may be, for example, one or more general purpose microprocessors.

Computer system 600 also includes main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes read only memory (ROM) 608 or other static storage device coupled to bus 602 for storing static information and instructions for processor 604. Storage device 610, such as a magnetic disk, optical disk, or USB thumb drive (Flash drive), etc., is provided and coupled to bus 602 for storing information and instructions.

Computer system 600 may be coupled via bus 602 to display 612, such as a liquid crystal display (LCD) (or touch screen), for displaying information to a computer user. The display may provide the AI chatbot module for the user to interact with and may also provide the query results that are generated by the LLM and other models. The data displayed may be limited to the data that the user is authorized to access, based on procedures described throughout the disclosure.

Computer system 600 may include a user interface module to implement a GUI to provide to display 612. The user interface module may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Computer system 600 may implement the techniques described herein using customized hard-wired logic, one or more ASICs or FPGAs, firmware and/or program logic which in combination with the computer system causes or programs computer system 600 to be a special-purpose machine. According to one example of the disclosed technology, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Computer system 600 also includes interface 618 coupled to bus 602. Interface 618 provides a two-way data communication coupling to one or more network links that are connected to one or more local networks. For example, interface 618 may be an integrated services digital network (ISDN) card, cable modem, satellite modem, or a modem to provide a data communication connection to a corresponding type of telephone line. As another example, interface 618 may be a local area network (LAN) card to provide a data communication connection to a compatible LAN (or WAN component to communicate with a WAN). Wireless links may also be implemented. In any such implementation, interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through interface 618, which carry the digital data to and from computer system 600, are example forms of transmission media.

Computer system 600 can send messages and receive data, including program code, through the network(s), network link and interface 618. In the Internet example, a server might transmit a requested code for an application program through the Internet, the ISP, the local network and interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method comprising:
   receiving customer data associated with a customer site and converting the customer data into embeddings using an embedding model;
   receiving a search query from a client device;
   authenticating the client device;
   in response to authenticating, providing the search query to a large language model (LLM);
   initiating an authorization process confirming that the client device is allowed to access the customer data accessible by the search query;
   in response to the authorization process, accessing the customer data identified by the LLM that is stored as the embeddings; and
   generating and providing a response to the search query based on the customer data.

2. The computer-implemented method of claim 1, wherein the LLM is reused for different search queries and for different use cases.

3. The computer-implemented method of claim 1, wherein the embedding model, the LLM, and the authorization process are implemented in a private cloud stored at the customer site, and the client device is configured to access the private cloud.

4. The computer-implemented method of claim 1, further comprising:
   storing the embeddings in an embedding data store; and
   storing vector representations of the embeddings in a vector data store.

5. The computer-implemented method of claim 1, wherein the search query is received from a chatbot module that is accessed by the client device.

6. The computer-implemented method of claim 1, further comprising:
   receiving the embedding model at the customer site; and
   once the embedding model is activated, automatically accessing the customer data at the customer site.

7. The computer-implemented method of claim 1, further comprising:
   receiving a knowledge base from an administrative user before the search query is received;
   converting the knowledge base into second embeddings using the embedding model; and
   storing the second embeddings in a vector data store at the customer site.

8. The computer-implemented method of claim 7, wherein an automated processing job uploads the second embeddings to a namespace associated with the client device.

9. The computer-implemented method of claim 7, wherein the embeddings accessed by the LLM are stored in a vector data store.

10. A private cloud platform comprising:
    a memory storing instructions; and
    a processor communicatively coupled to the memory and configured to execute the instructions to:
    receive customer data associated with a customer site and converting the customer data into embeddings using an embedding model;
    receive a search query from a client device;
    authenticate the client device;
    in response to authenticating, provide the search query to a large language model (LLM);
    initiate an authorization process confirming that the client device is allowed to access the customer data accessible by the search query;
    in response to the authorization process, access the customer data identified by the LLM that is stored as the embeddings; and
    generate and provide a response to the search query based on the customer data.

11. The private cloud platform of claim 10, wherein the LLM is reused for different search queries and for different use cases.

12. The private cloud platform of claim 10, wherein the embedding model, the LLM, and the authorization process are implemented in a private cloud stored at the customer site, and the client device is configured to access the private cloud.

13. The private cloud platform of claim 10, wherein the processor is further configured to:
    store the embeddings in an embedding data store; and
    store vector representations of the embeddings in a vector data store.

14. The private cloud platform of claim 10, wherein the search query is received from a chatbot module that is accessed by the client device.

15. The private cloud platform of claim 10, wherein the processor is further configured to:

receive the embedding model at the customer site; and once the embedding model is activated, automatically access the customer data at the customer site.

16. The private cloud platform of claim 10, wherein the processor is further configured to:

receive a knowledge base from an administrative user before the search query is received;

convert the knowledge base into second embeddings using the embedding model; and store the second embeddings in a vector data store at the customer site.

17. The private cloud platform of claim 16, wherein an automated processing job uploads the second embeddings to a namespace associated with the client device.

18. A non-transitory computer-readable storage medium storing a plurality of instructions executable by a processor, the plurality of instructions when executed by the processor cause the processor to:

receive customer data associated with a customer site and converting the customer data into embeddings using an embedding model;

receive a search query from a client device;

authenticate the client device;

in response to authenticating, provide the search query to a large language model (LLM);

initiate an authorization process confirming that the client device is allowed to access the customer data accessible by the search query;

in response to the authorization process, access the customer data identified by the LLM that is stored as the embeddings; and generate and provide a response to the search query based on the customer data.

19. The non-transitory computer-readable storage medium of claim 18, wherein the LLM is reused for different search queries and for different use cases.

20. The non-transitory computer-readable storage medium of claim 18, wherein the embedding model, the LLM, and the authorization process are implemented in a private cloud stored at the customer site, and the client device is configured to access the private cloud.

* * * * *